Nov. 11, 1958    H. C. IBAUGH ET AL    2,859,864
CONVEYOR CLEANING DEVICE

Filed May 16, 1956    2 Sheets-Sheet 1

INVENTORS
Harry C. Ibaugh + James R. West
Joseph Allen Brown
ATTORNEY

Nov. 11, 1958     H. C. IBAUGH ET AL     2,859,864
CONVEYOR CLEANING DEVICE

Filed May 16, 1956     2 Sheets-Sheet 2

INVENTORS
Harry C. Ibaugh + James R. West
Joseph Allen Brown
ATTORNEY

2,859,864
CONVEYOR CLEANING DEVICE

Harry C. Ibaugh, Honey Brook, and James R. West, New Holland, Pa., assignors to Sperry Rand Corporation, New Holland, Pa., a corporation of Delaware Application May 16, 1956, Serial No. 585,322

5 Claims. (Cl. 198—229)

The present invention relates generally to conveyors of the endless belt type, and more particularly to a cleaning device for removing foreign material from between the upper and lower reaches of an endless belt.

When an endless belt conveyor is used for moving forage or other fibrous crop material, a certain amount of the material invariably gets in between the reaches of the belt; and, if this material is allowed to accumulate, the rolls for the belt will become fouled and belt slippage will result.

Heretofore, attempts have been made to close off the space between the belts to block the entry of material. However, such attempts have been generally ineffective, merely delaying the time when the conveyor operation is impaired due to build-up of material between the reaches of the belt.

One object of this invention is to provide a cleaning device for between the upper and lower reaches of an endless belt, said device including a belt scraper so constructed that material scraped from a belt will be conveyed laterally relative to the direction of movement of the belt and then discharged.

Another object of this invention is to provide a cleaning device which includes a roll scraper in combination with a belt scraper, said roll scraper being of such structure that material removed from a roll is conveyed to a point in front of the belt scraper where it merges with the material cleaned off by the belt scraper. Then, the combined material is moved laterally and discharged.

A further object of this invention is to provide, in a cleaning device of the character described, a belt scraper which is mounted in floating operative engagement with the lower reach of an endless belt which it is adapted to clean.

A still further object of this invention is to provide a cleaning device of the character described which is of simple construction and few parts, thereby enabling its manufacture at low cost.

Other objects of this invention will be apparent hereinafter from the specification and from the recital in the appended claims.

Figure 2:
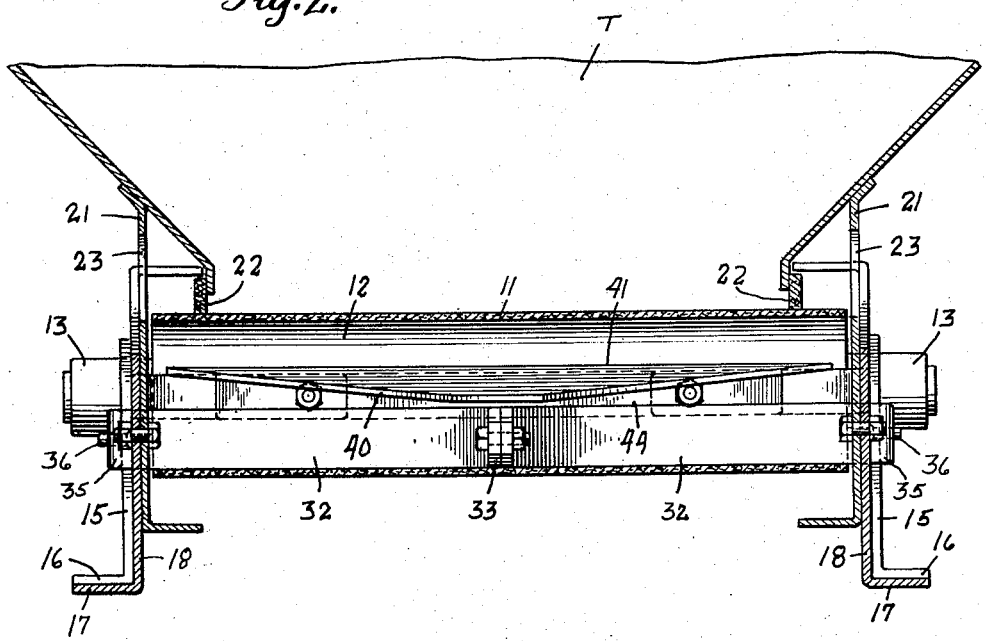
Fig. 2 is a section taken on the line 2—2 of Fig. 1, and looking in the direction of the arrows.

Referring now to the drawings by numerals of reference, 10 denotes generally a horizontal conveyor of the type used, for example, in feeding crop material into a chopper and blower unit, such as that shown in U. S. Patent No. 2,712,412, issued July 5, 1955. The conveyor includes an endless belt 11 which is trained around spaced parallel rolls, one of which 12 is shown. Roll 12 is journaled in bearing assemblies 13 carried on a pair of vertical support legs or straps 15. The legs 15 are out-turned at their lower ends 16 and supported on the out-turned lower ends 17 of the spaced, parallel side frame members 18 (Fig. 2). Each frame member 18 has an elongate horizontally extending slot opening 19 through which one of the bearing assemblies projects.

Conventional means, not shown, is provided for biasing roll 12 away from its cooperating roll or rolls to insure proper tightness of belt 11. The support legs 15 permit such movement of roll 12, being slideable on the out-turned ends 17 of frame members 18 which serve as tracks.

Frame members 18 are secured by bolts 20 to the depending side walls 21 of a trough T, the bottom of which is constituted by endless belt 11. Belt 11 is adapted to be driven clock-wise or towards the right of Fig. 1 to feed crop material dumped into trough T. Affixed to the lower end of trough T are flexible guard strips 22, as shown in Fig. 2, which project downwardly and abut against belt 11 to limit lateral escape of material from adjacent the bottom of trough T.

While guard strips 22 are effective to a certain degree in preventing the lateral escape of material from trough T, some fine fibrous material is able, nevertheless, to pass between the strips and belt 11. Because of this fact, elongate, narrow longitudinal slots 23 are provided in side walls 21 to permit escape of material which passes under guard strips 22. Otherwise, in time, the material would build up in the spaces defined by trough T, guard strips 22, belt 11, and side walls 21, and foul the conveyor.

Further, while strips 22 and slots 23 dispose of the major portion of material which escapes from trough T, a portion of this material drops between the side edges of belt 11 and side walls 21, and becomes deposited between the upper reach 11a and lower reach 11b of belt 11. To remove such material, the cleaning device 30 of this invention is provided. This device will now be described.

Figure 3:
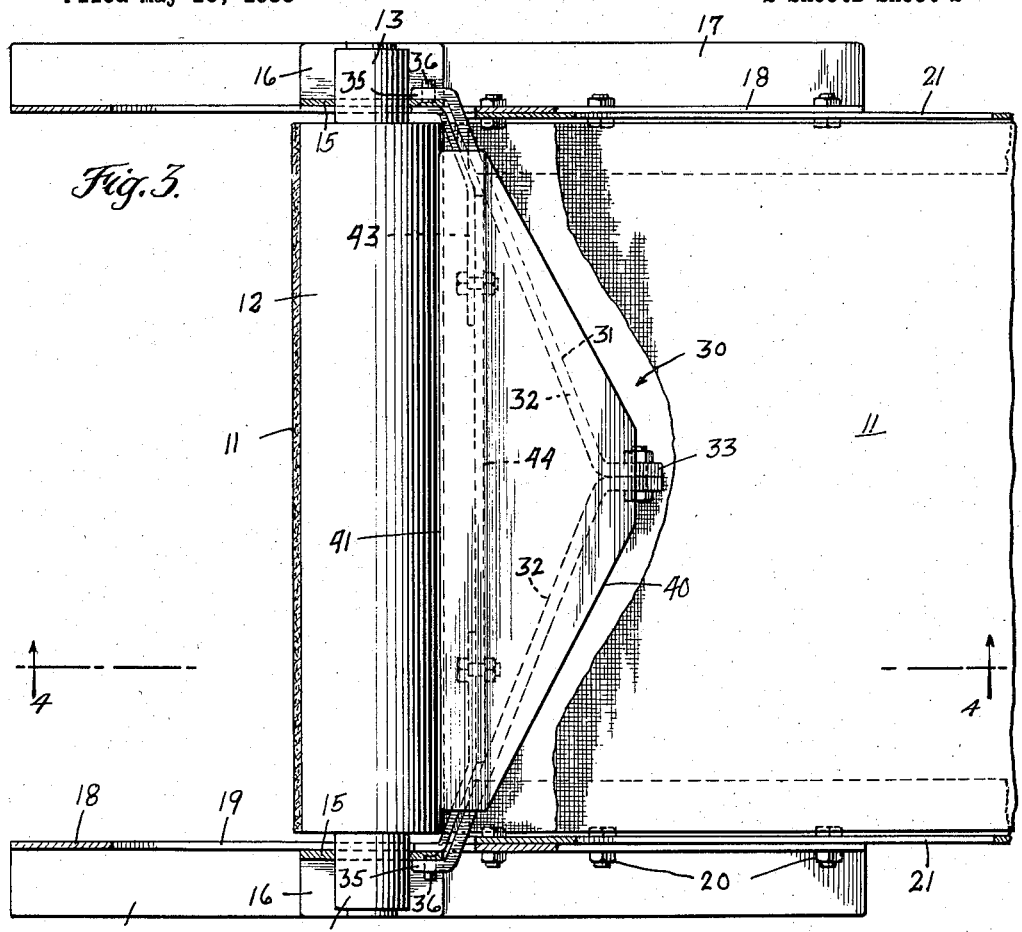
Fig. 3 is a section taken on the lines 3—3 of Fig. 1 and looking in the direction of the arrows; and, Fig. 4 is a section taken on the line 4—4 of Fig. 3 and looking in the direction of the arrows.

Device 30 includes a belt scraper 31 which extends across and floatably seats upon the lower reach 11b of endless belt 11. Scraper 31 comprises a pair of scraper members 32—32 arranged, as best shown in Fig. 3, in the form of a triangle and connected at 33, the apex of the triangle or V. The scraper faces in a direction opposite to the direction of travel of the lower reach 11b. Thus, any material on lower reach 11b is directed against the belt scraper which operates to remove the material and directs it laterally toward side walls 21. The material moves along scraper members 32 and is ejected through the openings 19 in side frame members 18.

Scraper members 32 have rear ends 35—35 which project through openings 19 in frame members 18 and extend parallel to support legs 15. Each support leg carries an outwardly projecting pin 36 which extends through a vertical slot 37 in its associated scraper end member 35. It will thus be seen that scraper 31 is free to float vertically on lower reach 11b. Further, as roll 12 is moved toward or away from its associated roll under the influence of the biasing means which keeps belt 11 taut, the scraper moves with it.

Associated with belt scraper 31, and cooperative therewith, is a roll scraper 40 which over-lies the belt scraper. Roll scraper 40 is generally triangular in shape. It has an edge 41 which engages the periphery of roll 12 and scrapes any material which may be on it. Roll scraper 40 is mounted on bracket members 43 which are bolted to a transverse brace member 44 which is welded to the bottom of the roll scraper. The ends of brackets 43 extend to support legs 15 where they are connected to the inner faces thereof (Fig. 3) by any suitable means.

Figure 1:
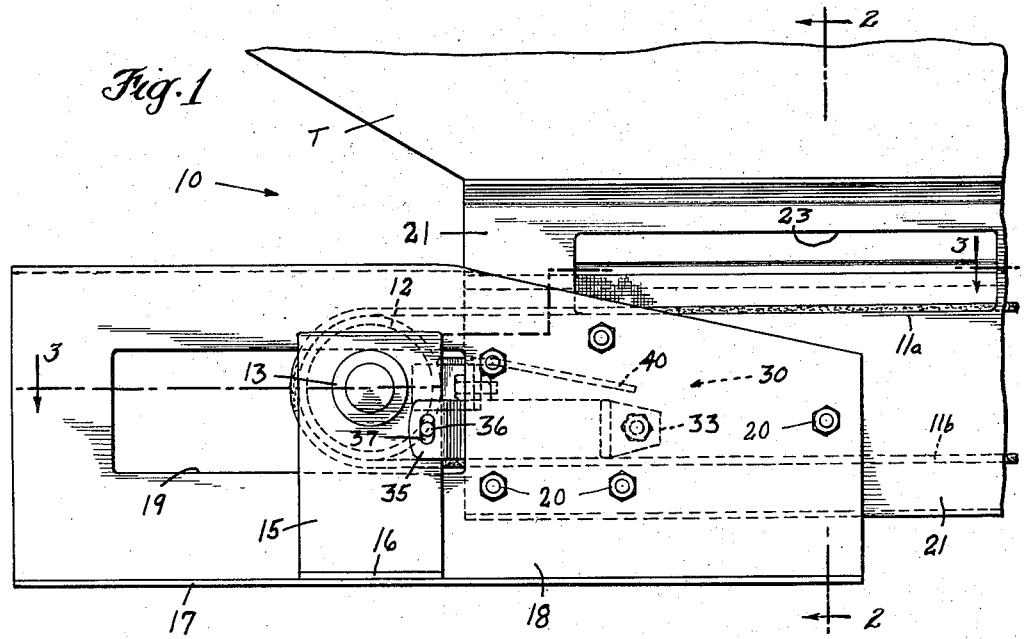
Fig. 1 is a fragmentary side elevation of one end of a belt feed conveyor-trough having a cleaning device constructed according to one embodiment of this invention.
Figure 4:
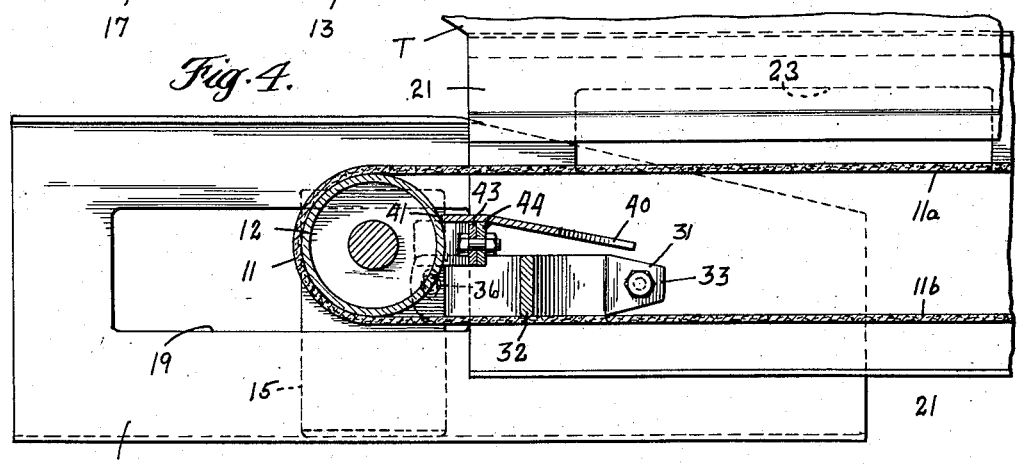

As shown in Figs. 1 and 4, roll scraper 40 extends rearwardly from roll 12 and is inclined downwardly; therefore, material removed from roll 12 slides down scraper 40 and off its rear edge. The configuration of the roll scraper is such that the material removed by roll scraper 40 is deposited in front of belt scraper 31. Such material merges with the material scraped off by the belt scraper and the combined material is moved laterally and through openings 19 for discharge by the movement of the belt 11. As previously stated, the movement of the lower reach 11b of the endless belt is utilized to produce lateral displacement of material by directing this material against the angularly extending members 32 of the belt scraper.

From the above, it will be seen that applicants have provided a cleaning device of simple construction and few parts which can be manufactured at low cost. It is far more effective than cleaning devices heretofore available in that it not only removes material on the lower reach of the endless belt, but also removes material from a roll over which the belt is trained. Moreover, due to the structure employed, the material which is removed by the roll scraper and belt scraper is evacuated from between the endless belt.

While the invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described our invention what we claim is:

1. A device for cleaning material from between the upper and lower reaches of an endless belt and from a roll over which the belt is trained, comprising, in combination, a belt scraper disposed on and extending completely across said lower reach, and a roll scraper engaging the periphery of the roll and extending outwardly and downwardly therefrom, said roll scraper having an end remote from said roll which extends beyond said belt scraper whereby material scraped from said roll may slide down the roll scraper and be deposited on the side of said belt scraper remote from the roll.

2. A device for cleaning material from between the upper and lower reaches of a generally horizontal endless belt, and from a roll over which the belt is trained, comprising, a V-shaped scraper disposed on said lower reach adjacent said roll and having its apex pointing in a direction opposite to the direction of movement of said lower reach, a roll scraper engaging the periphery of the roll and extending outwardly and downwardly therefrom, said roll scraper overlying said V-shaped scraper whereby material removed from said roll is deposited in front of said V-shaped scraper, the sides of said V-shaped scraper forming deflectors cooperative with the movement of said lower reach to cause the material removed from said lower reach and the material deposited by said roll scraper to be conveyed laterally relative to the direction of movement of said belt.

3. A device for cleaning material from between the upper and lower reaches of a revolvable endless belt and from a roll over which the belt is trained, wherein said lower reach is movable toward said roll, comprising a belt scraper disposed on and extending completely across said lower reach, a roll scraper engaging the periphery of said roll and extending outwardly and downwardly therefrom and having a free end extending beyond said belt scraper whereby material scraped from said roll may slide down the roll scraper and be deposited on the side of the belt scraper remote from the roll, said belt scraper being of such configuration that material deposited by said roll scraper and material moving against it on said lower reach is deflected laterally.

4. A device as recited in claim 3, wherein said roll is slidably mounted for movement in a direction parallel to the direction of movement of said belt, there being provided means for connecting said belt scraper to said roll for slidable movement therewith and for floating movement relative thereto, and there also being provided means for connecting said roll scraper to said belt scraper.

5. A device as recited in claim 4, wherein said belt scraper is generally V-shaped, the apex of the V being disposed remote from said roll and facing contra to the direction of movement of said lower reach.

References Cited in the file of this patent

UNITED STATES PATENTS

| | | |
|---|---|---|
| 1,729,322 | Barber | Sept. 24, 1929 |
| 1,779,686 | Alver | Oct. 28, 1930 |
| 1,871,503 | Duesberg | Aug. 16, 1932 |
| 1,933,485 | Rund et al. | Oct. 31, 1933 |
| 2,157,301 | Neumann | May 9, 1939 |